US012555394B2

(12) United States Patent
Midorikawa

(10) Patent No.: US 12,555,394 B2
(45) Date of Patent: Feb. 17, 2026

(54) IMAGE PROCESSING APPARATUS, METHOD, AND STORAGE MEDIUM FOR GENERATING DATA BASED ON A CAPTURED IMAGE

(71) Applicant: CANON KABUSHIKI KAISHA, Tokyo (JP)

(72) Inventor: Waki Midorikawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 463 days.

(21) Appl. No.: 18/060,645

(22) Filed: Dec. 1, 2022

(65) Prior Publication Data
US 2023/0177851 A1 Jun. 8, 2023

(30) Foreign Application Priority Data
Dec. 8, 2021 (JP) ................ 2021-199189

(51) Int. Cl.
*G06V 20/64* (2022.01)
*G06V 10/22* (2022.01)
*G06V 20/10* (2022.01)

(52) U.S. Cl.
CPC ............. *G06V 20/64* (2022.01); *G06V 10/22* (2022.01); *G06V 20/10* (2022.01)

(58) Field of Classification Search
CPC . G06T 2207/30228; G06T 2207/30221; G06T 17/00; G06T 2207/20224;
(Continued)

(56) References Cited

U.S. PATENT DOCUMENTS

2007/0279494 A1* 12/2007 Aman .................... H04N 5/262
348/169
2012/0262569 A1* 10/2012 Cudak .................... H04N 23/58
348/222.1
(Continued)

FOREIGN PATENT DOCUMENTS

JP 2019106145 A 6/2019
JP 2020135525 A 8/2020
(Continued)

OTHER PUBLICATIONS

English Translation: KR-20210112027-A (Year: 2021).*
(Continued)

*Primary Examiner* — Sumati Lefkowitz
*Assistant Examiner* — Aaron Joseph Sorrin
(74) *Attorney, Agent, or Firm* — Carter, DeLuca & Farrell LLP

(57) ABSTRACT

The image processing apparatus specifies a first area in a captured image, the first area being an area in which another object having a possibility of occluding a target object for which to generate three-dimensional shape data may exist, the other object being not an object for which to generate three-dimensional shape data, and generates the three-dimensional shape data of the target object based on an area of the other object and an area of the target object, the area of the other object being detected from the specified first area and the area of the target object being detected from the captured image.

9 Claims, 10 Drawing Sheets

(58) Field of Classification Search
CPC ........... G06T 7/194; G06T 7/11; G06V 20/42; G06V 10/22; G06V 10/25; G06V 20/53; G06V 20/64; G06V 10/26; H04N 5/272
See application file for complete search history.

(56) References Cited

U.S. PATENT DOCUMENTS

| | | | | |
|---|---|---|---|---|
| 2014/0355829 | A1* | 12/2014 | Heu | ........................... G06T 7/20 382/103 |
| 2018/0232891 | A1* | 8/2018 | Kim | ......................... G06T 7/254 |
| 2018/0350136 | A1* | 12/2018 | Rowley | ..................... G06T 7/73 |
| 2021/0201511 | A1 | 7/2021 | Midorikawa | |

FOREIGN PATENT DOCUMENTS

| | | | |
|---|---|---|---|
| JP | 2021099671 A | | 7/2021 |
| KR | 20210112027 A | * | 9/2021 |

OTHER PUBLICATIONS

Notice of Reasons for Refusal issued by the Japanese Patent Office on Aug. 19, 2025 in corresponding JP Patent Application No. 2021-199189, with English translation.

* cited by examiner

IMAGE PROCESSING APPARATUS, METHOD, AND STORAGE MEDIUM FOR GENERATING DATA BASED ON A CAPTURED IMAGE

BACKGROUND OF THE DISCLOSURE

Field of the Disclosure

The present disclosure relates to generation of data based on a captured image.

Description of the Related Art

There is a method of generating three-dimensional shape data of an object by using a mask image and camera parameters, the mask image representing a two-dimensional silhouette of the object generated from a plurality of captured images by image capturing of a plurality of imaging apparatuses. In a case where three-dimensional shape data is generated by this method, on a condition that an obstacle exists between an object for which to generate three-dimensional shape data and an imaging apparatus, the generation accuracy of the three-dimensional shape of the object may be reduced sometimes.

Japanese Patent Laid-Open No. 2019-106145 has disclosed a method of suppressing the occurrence of a defect in the three-dimensional shape of an object, the defect being caused because the object is occluded by a structure in a case where the obstacle is a stationary structure.

There is a case where a person who is not stationary, such as a spectator, acts as an obstacle that occludes an object for which to generate three-dimensional shape data. With the method of Japanese Patent Laid-Open No. 2019-106145, in a case where an object for which to generate three-dimensional shape data is occluded by an obstacle that is not stationary, it is not possible to suppress the occurrence of a defect in the three-dimensional shape.

SUMMARY OF THE DISCLOSURE

The image processing apparatus of the present disclosure includes: one or more memories storing instructions; and one or more processors executing the instructions to: specify a first area in a captured image, the first area being an area in which another object having a possibility of occluding a target object for which to generate three-dimensional shape data may exist, the other object being not an object for which to generate three-dimensional shape data; and generate the three-dimensional shape data of the target object based on an area of the other object and an area of the target object, the area of the other object being detected from the specified first area, the area of the target object being detected from the captured image.

Further features of the present disclosure will become apparent from the following description of exemplary embodiments with reference to the attached drawings.

DESCRIPTION OF THE EMBODIMENTS

In the following, with reference to the attached drawings, details of the technique of the present disclosure are explained based on embodiments. The configurations shown in the following embodiments are merely exemplary and the technique of the present disclosure is not limited to the configurations shown schematically.

First Embodiment

[About Virtual Viewpoint Image]

There is a method of generating an image representing an appearance from a virtual viewpoint independent of the viewpoint of a real imaging apparatus by installing a plurality of imaging apparatuses at different positions to perform image capturing in time synchronization from a plurality of viewpoints and using a plurality of images obtained by the image capturing. An image representing an appearance from a virtual viewpoint, which is generated by this method, is called a virtual viewpoint image. With virtual viewpoint images, it is possible for a user to view a highlight scene of a game, such as soccer, from a variety of angles, and therefore, it is possible to give a user a great feeling of being at a live performance compared to a normal captured image. The virtual viewpoint image may be a moving image or a still image. In the following embodiment, explanation is given on the assumption that the virtual viewpoint image is a moving image.

The virtual viewpoint image is generated by generating three-dimensional shape data (also referred to as three-dimensional model) representing the three-dimensional shape of an object, which is a foreground, and arranging the three-dimensional model in the background, and coloring the three-dimensional model so as to represent an appearance from the virtual viewpoint. For the generation of the three-dimensional model and drawing of the background, the data is used, which is based on captured images obtained by image capturing of a plurality of imaging apparatuses whose orientation has been determined in advance and for which calibration has been performed and which is capable of image capturing in time synchronization by inputting a common synchronization signal and time code. The object for which to generate a three-dimensional model is an object that enables being viewed from an arbitrary angle of the virtual viewpoint and for example, a player existing on the field of a game stadium.

Figure 1:
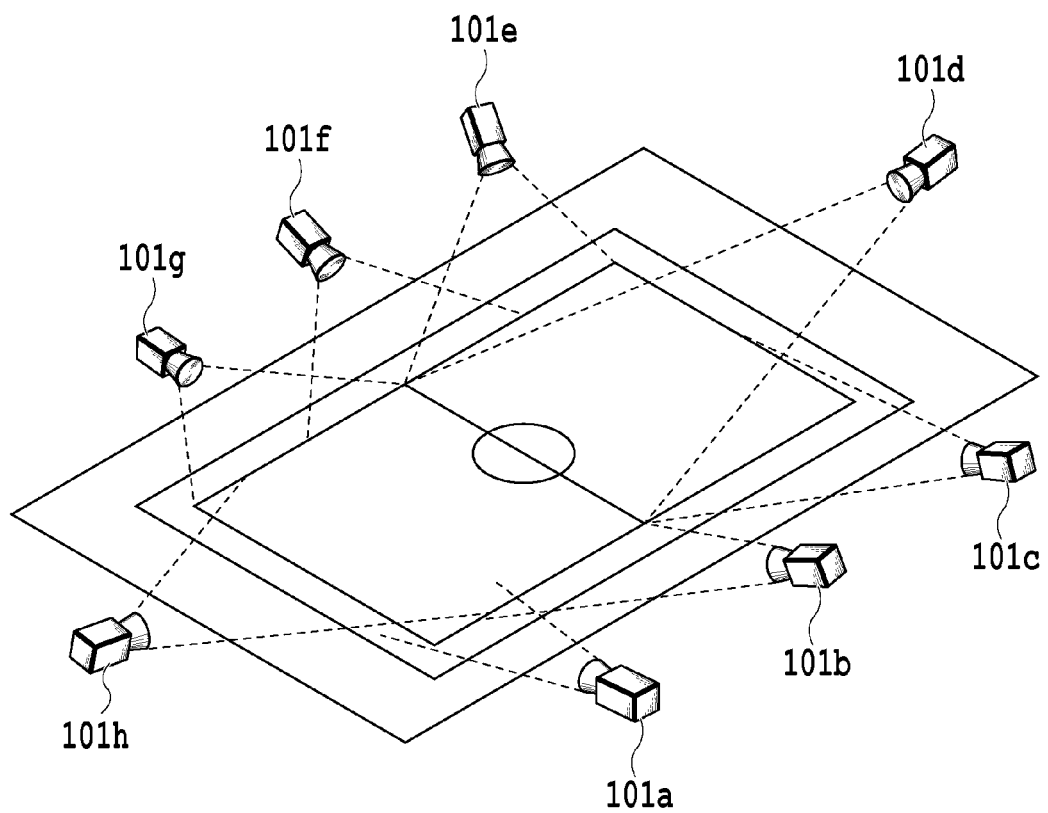
FIG. 1 is a diagram showing an arrangement example of imaging apparatuses.

FIG. 1 is a diagram showing an installation example of imaging apparatuses 101a to 101h. Cameras, which are the imaging apparatuses, are arranged so as to capture the entire image capturing space (game stadium) in which the object for which to generate a three-dimensional model exists as shown in FIG. 1. Then, each of the imaging apparatuses 101a to 101h outputs a captured image to which a unique camera ID and a time code in common within a camera array configured by the imaging apparatuses 101a to 101h are appended as an input image of a virtual viewpoint image generation apparatus 200, to be described later.

It is desirable to install the plurality of the imaging apparatuses 101a to 101h at positions at which an obstacle not the target for which to generate a three-dimensional model is not captured. However, some of the imaging apparatuses 101a to 101h may be installed at positions near to the object for which to generate a three-dimensional model and whose height is low because of the constraint of arrangement or for the purpose of obtaining a texture image of a high quality.

[Hardware Configuration]

Figure 2:
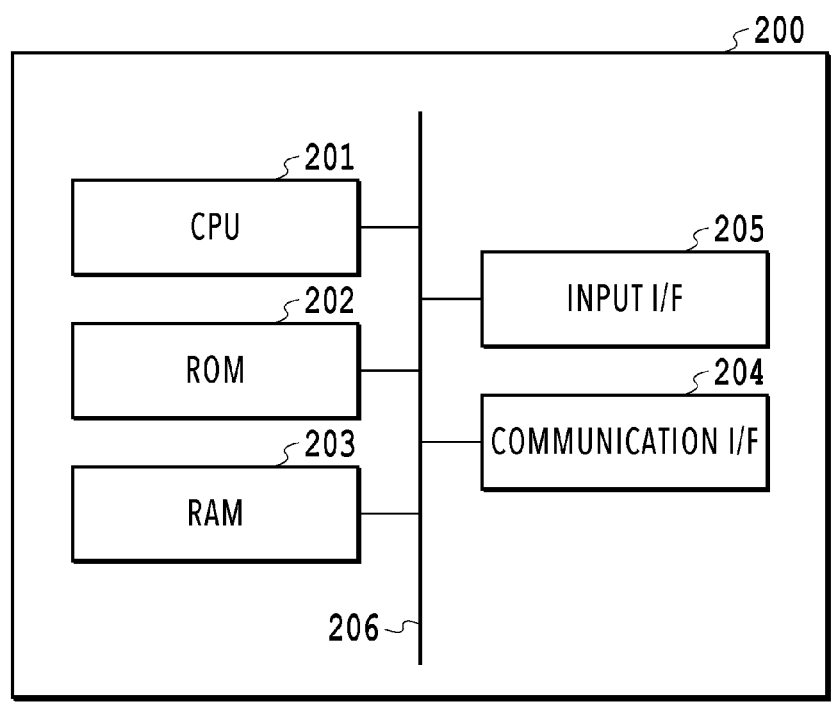
FIG. 2 is a diagram showing an example of a hardware configuration of a virtual viewpoint image generation apparatus.

FIG. 2 is a diagram showing the hardware configuration of the virtual viewpoint image generation apparatus 200, which is an image processing apparatus that generates a virtual viewpoint image based on captured images of a plurality of imaging apparatuses. The virtual viewpoint image generation apparatus 200 has a CPU 201, a ROM 202, a RAM 203, an input I/F 205, a communication I/F 204, and a bus 206.

Figure 3:
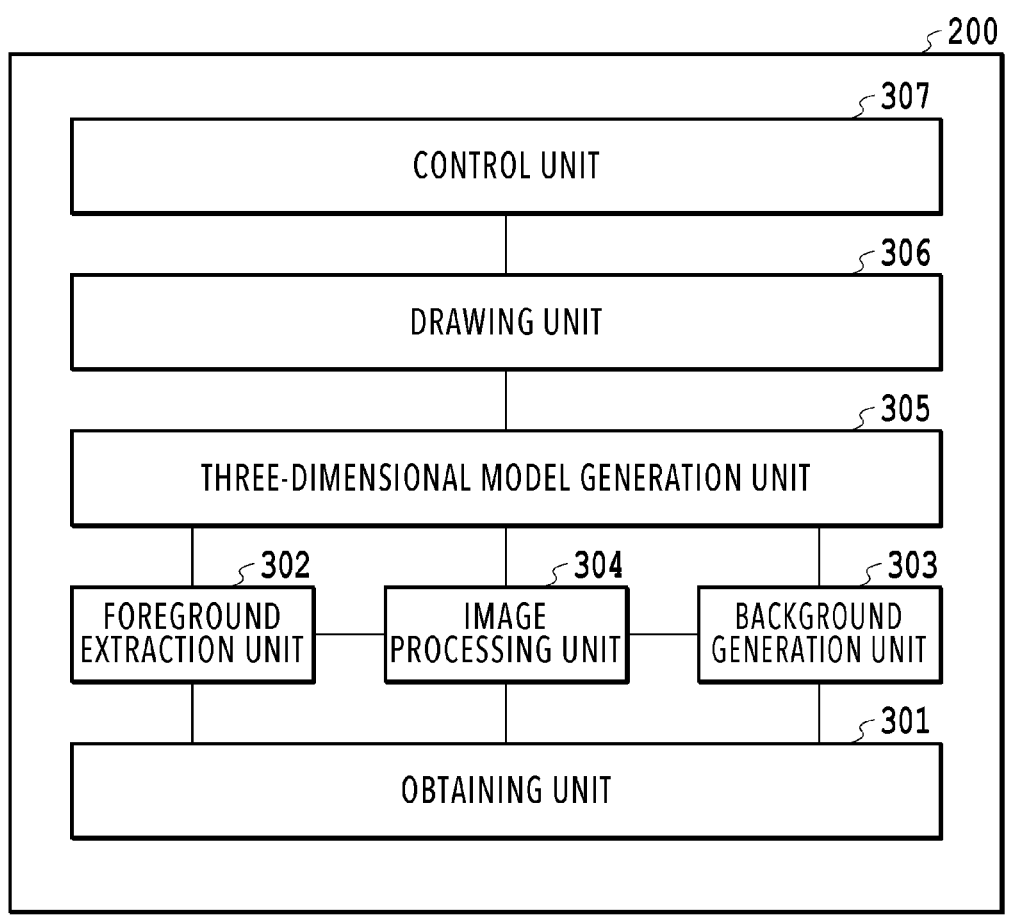
FIG. 3 is a diagram showing an example of a function configuration of the virtual viewpoint image generation apparatus.

The CPU 201 implements each function of the virtual viewpoint image generation apparatus 200 shown in FIG. 3 by controlling the entire virtual viewpoint image generation apparatus 200 using computer programs and data stored in the ROM 202 and the RAM 203. Further, the CPU 201 implements arithmetic processing for an input image that is input from the input I/F 205. It may also be possible to configure the virtual viewpoint image generation apparatus 200 so as to comprise one piece or a plurality of pieces of dedicated hardware different from the CPU 201 and perform at least part of the processing that is performed by the CPU 201. As examples of dedicated hardware, there are a processor used for image processing and control, an ASIC (Application Specific Integrated Circuit), an FPGA (Field Programmable Gate Array), a DSP (Digital Signal Processor) and the like.

The ROM 202 stores programs and the like that do not need to be changed. The RAM 203 temporarily stores programs supplied from the ROM 202, data used for implementing the function of each function block, data supplied from the outside via the communication I/F 204, and the like. The input I/F 205 is a reception unit, such as an SDI and an HDMI (registered trademark), and obtains an input image.

The communication I/F 204 is used for communication with an external device. For example, in a case where the virtual viewpoint image generation apparatus 200 is connected by wire with an external device, a communication cable is connected to the communication I/F 204. In a case where the virtual viewpoint image generation apparatus 200 has a function to wirelessly communicate with an external device, the communication I/F 204 comprises an antenna. The bus 206 connects each unit of the virtual viewpoint image generation apparatus 200 and transmits information.

In addition, at least one of a display unit and an operation unit, both not shown schematically, may be included, or at least one of the display unit and the operation unit may exist as another external device. The display unit includes, for example, a liquid crystal display, an LED and the like and displays a GUI (Graphical User Interface) for a user to operate the virtual viewpoint image generation apparatus 200, and the like. The operation unit includes, for example, a keyboard, a mouse, a joystick, a touch panel and the like and inputs various instructions to the CPU 201 in response to the operation by a user. The CPU 201 operates as a display control unit configured to control the display unit and an operation control unit configured to control the operation unit.

[About Function Configuration of Virtual Viewpoint Image Generation Apparatus]

FIG. 3 is a diagram showing an example of the function configuration of the virtual viewpoint image generation apparatus 200. The virtual viewpoint image generation apparatus 200 has an obtaining unit 301, a foreground extraction unit 302, an image processing unit 304, a background generation unit 303, a three-dimensional model generation unit 305, a control unit 307, and a drawing unit 306.

The obtaining unit 301 obtains captured images obtained by a plurality of the imaging apparatuses 101a to 101h performing image capturing in time synchronization.

The foreground extraction unit 302 extracts the foreground area indicating the area of an object included in the captured image from the captured image of each of the imaging apparatuses 101a to 101h. Then, the foreground extraction unit 302 generates a mask image representing the captured image by two values of the foreground area and the non-foreground area (called foreground shape mask). Further, the foreground extraction unit 302 generates a texture image (foreground texture) of the object that is taken to be the foreground. The foreground extraction unit 302 appends the camera ID of each imaging apparatus and a time code to the foreground texture and the foreground shape mask. Then, the foreground extraction unit 302 outputs the foreground texture and the foreground shape mask to the three-dimensional model generation unit 305.

As the method of extracting a foreground from a captured image, there is a background subtraction method. This method is a method in which, for example, the state of the image capturing environment in which no object exists is captured and stored in advance as a background image and then an area whose difference value in the pixel value between the captured image and the background image is larger than a threshold value is determined to be a foreground. The method of extracting a foreground is not limited to the method using background subtraction information. In addition to the above-described method, it may also be possible to use a method using disparity, a method using feature amount, or a method using machine learning as the method of extracting a foreground.

The background generation unit 303 generates a background image to which a time code is appended. It may also be possible to generate a background image by using texture of a captured image whose time code is the same, or generate a background image by appending a time code to the data of an image desired to be taken as the background of a virtual viewpoint image.

The image processing unit 304 determines an area (called occluding area) having a possibility that the object for which to generate a three-dimensional model within the captured image of each of the imaging apparatuses 101a to 101h is occluded. Then, the image processing unit 304 outputs occluding area information, which is information indicating the position and shape of the occluding area. To the occluding area information, information on the time code of the captured image for enabling correspondence with the captured image (frame) is appended. Further, the camera ID of the imaging apparatus is appended to indicate which imaging apparatus the occluding area corresponds to. Details of processing of the image processing unit 304 will be described later.

The three-dimensional model generation unit 305 obtains the data of the foreground texture, the foreground shape mask, and the occluding area information corresponding to all the imaging apparatuses that can be utilized for the generation of a three-dimensional model. To each of the foreground texture, the foreground shape mask, the background image, and the occluding area information, information on the time code of the captured image is appended. Because of this, it is possible to perform processing using each piece of data by synchronizing the foreground texture, the foreground shape texture, the background image, and the occluding area information.

In a case where information on the occluding area is included in the occluding area information, the three-dimensional model generation unit 305 merges the shape of the occluding area designated by the occluding area information with the foreground shape mask to which the camera ID of the corresponding imaging apparatus is appended. The mask image obtained as a result of that is called an integrated mask. The three-dimensional model generation unit 305 also functions as a generation unit configured to generate an integrated mask. In a case where the generation of the integrated mask corresponding to all the imaging apparatuses is completed, the three-dimensional model generation unit 305 generates a three-dimensional model by the visual hull method based on the generated integrated mask. The three-dimensional model generation unit 305 outputs the three-dimensional model and the foreground texture and notifies the drawing unit 306 of the completion of the generation of the three-dimensional model.

The drawing unit 306 obtains information on the background image, the three-dimensional model, the foreground texture, and the virtual viewpoint. Then, the drawing unit 306 performs coloring for the obtained three-dimensional model based on the foreground texture and superimposes the three-dimensional model on the background image. Then, the drawing unit 306 outputs the image from the virtual viewpoint, which is projected onto the two-dimensional coordinates, as a virtual viewpoint image.

The control unit 307 performs control of each unit of the virtual viewpoint image generation apparatus 200. For example, the control unit 307 performs control for generating a virtual viewpoint image corresponding to a virtual viewpoint by obtaining coordinate information indicating the virtual viewpoint designated by a user. Further, the control unit 307 generates and outputs occluding area detection information, to be described later.

[Function Configuration of Image Processing Unit]

Figure 4:
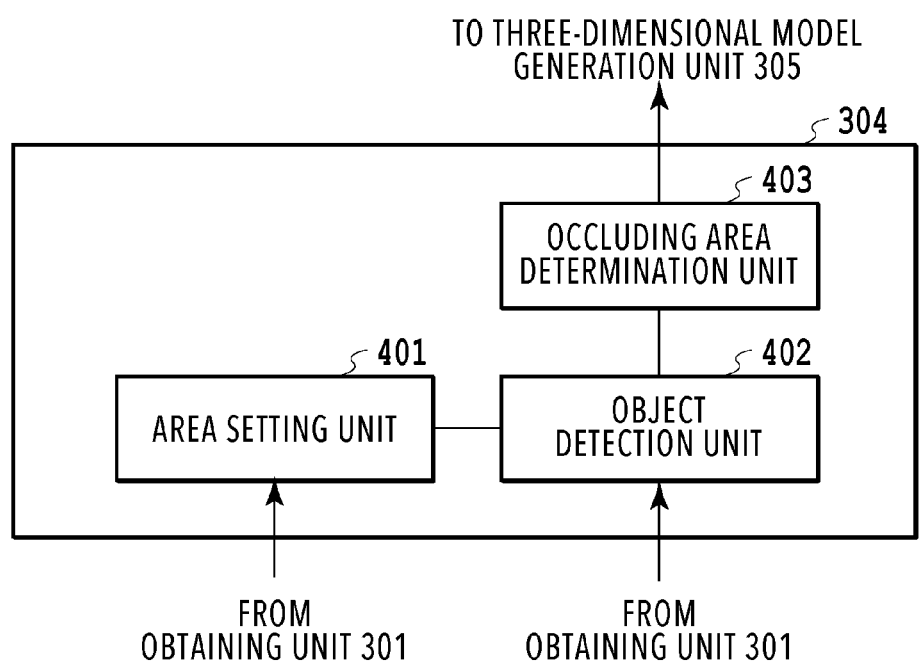
FIG. 4 is a diagram showing an example of a function configuration in an image processing unit.

FIG. 4 is a block diagram showing an example of the function of the image processing unit 304. The image processing unit 304 has an area setting unit 401, an object detection unit 402, and an occluding area determination unit 403.

The area setting unit 401 refers to detection condition of an occluding area and sets an area within a captured image that is taken to be a target in which to detect an occluding object.

Figure 5A:
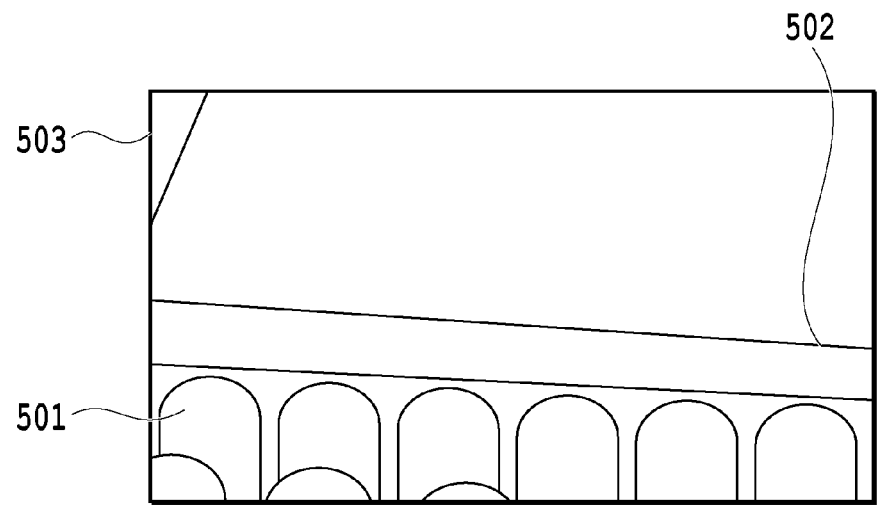
FIG. 5A and FIG. 5B are each a diagram showing an example of a captured image.
Figure 5B:
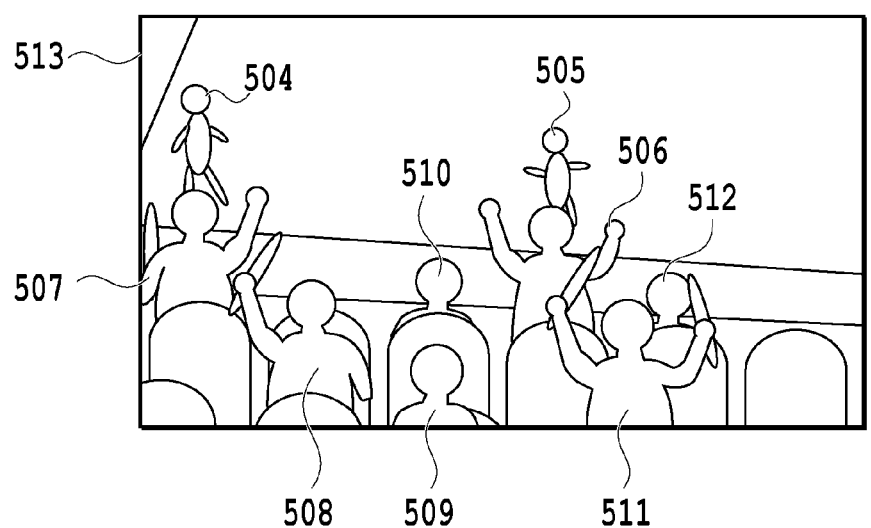

FIG. 5A and FIG. 5B are each a diagram showing an example of a captured image of one of the imaging apparatuses 101a to 101d. FIG. 5A is a diagram showing a captured image 503 obtained by performing image capturing for camera calibration and a captured image obtained by capturing a game stadium, which is an image capturing space, in the state where no players or no spectators exist. Within the captured image, a spectator stand area 501 and a court 502 are included as a background.

FIG. 5B is a diagram showing a captured image 513 obtained by capturing the image capturing space while a game is played. That is, the captured image 513 is an example of the captured image for generating data, such as a foreground shape mask, which is used for the generation of a virtual viewpoint image. Within the captured image, players 504 and 505, and spectators 506 to 512 are included. In a case where only the players 504 and 505 among those are taken as a target for which to generate a three-dimensional model as a foreground object, depending on the position of the imaging apparatus, part of the foreground object is occluded by another object, such as the spectators 506 and 507. The object, such as a spectator, is called an occluding object which is an object whose shape and arrangement change and has a possibility of existing between the foreground object (player) for which to generate a three-dimensional model and the imaging apparatus. The occluding object is not limited to a person and equipment and the like whose orientation and position change may be regarded as an occluding object.

The area setting unit 401 outputs occluding object detection information including information on the position and shape of the area (called object detection area) within the captured image in which to detect an occluding object. In addition thereto, in the occluding object detection information, a detection method of an occluding object and filtering parameters utilized for determining validness of an extracted object may be included.

The object detection unit 402 detects an object from the object detection area within a captured image and detects an occluding object from the detected object.

The occluding area determination unit 403 determines an occluding area that is an area having a possibility of occluding a foreground object based on the detected occluding object. Details of the processing of the area setting unit 401, the object detection unit 402, and the occluding area determination unit 403 are explained by using a flowchart.

[Details of Processing of Image Processing Unit]

Figure 6:
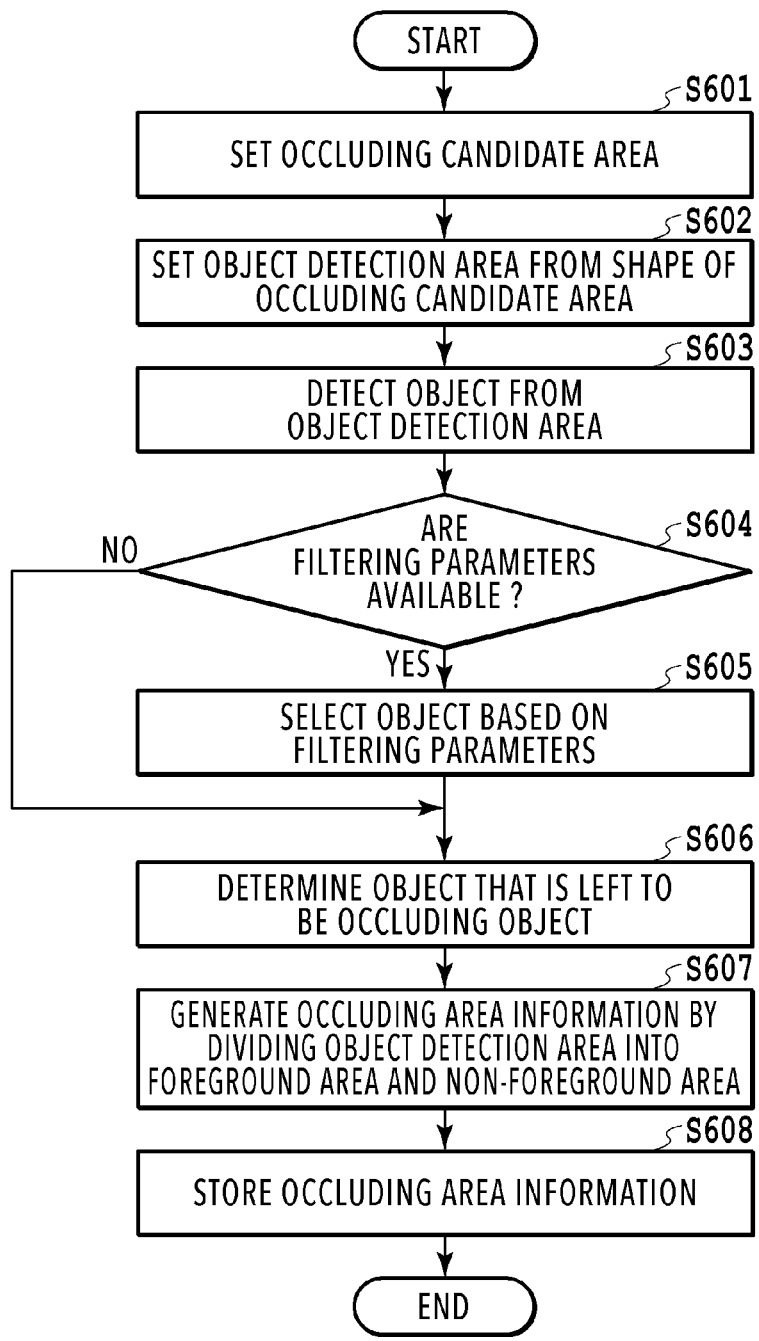
FIG. 6 is a flowchart for explaining processing by the image processing unit.

FIG. 6 is a flowchart for explaining an example of the processing of the image processing unit 304. The series of processing shown by the flowchart in FIG. 6 is performed by the CPU of the virtual viewpoint image generation apparatus 200 loading a program code stored in the ROM onto the RAM and executing the program code. It may also be possible to implement part or all of the functions at the steps in FIG. 6 by hardware, such as an ASIC and an electronic circuit. Symbol "S" in the explanation of each piece of processing means that the step is a step in the flowchart.

The following steps are performed for each captured image obtained by the imaging apparatuses 101a to 101d performing image capturing, but in the following explanation, the processing in a case where the captured image of one of the imaging apparatuses 101a to 101d is taken to be an input image is explained.

In a case of a moving image, the following processing of the flowchart is performed repeatedly each time a frame constituting the moving image is obtained. In the processing of the next and subsequent frames, it may also be possible to skip at least one of S601 and S602.

At S601, the area setting unit 401 determines the position and shape of an occluding candidate area in an input image based on occluding area detection information. The area within the input image, which has a possibility that an occluding object exists, is called an occluding candidate area.

Figure 7A:
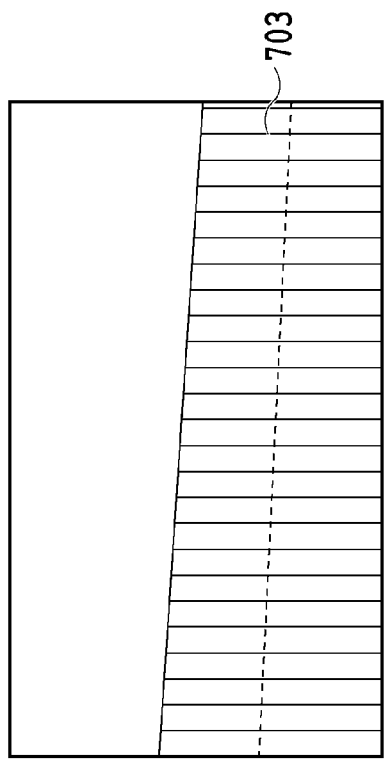
FIG. 7A to FIG. 7D are diagrams for explaining an occluding candidate area and an object detection area within a captured image.
Figure 7B:
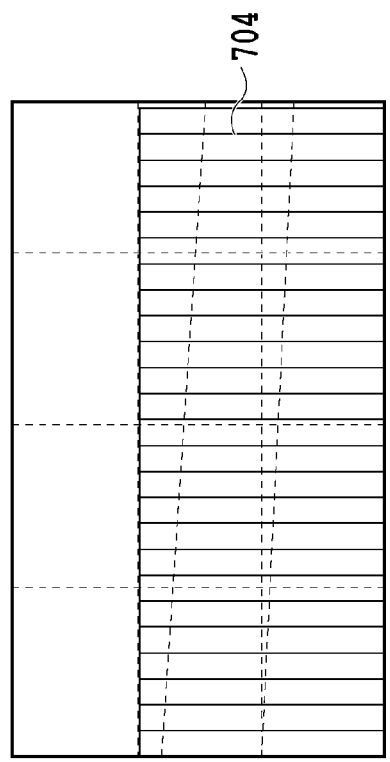

In a case of determining an occluding candidate area from an input image 701 in FIG. 7A, for example, the area of the spectator stand having a possibility that a spectator who is taken to be an occluding object exists is determined as an occluding candidate area. In this case, as shown in FIG. 7B, the shaded area corresponding to the spectator stand is set as an occluding candidate area 702.

By the control unit 307 supplying a captured image used for calibration to the image processing unit 304 after the completion of calibration and instructing the image processing unit 304 to perform initialization including setting of an occluding candidate area, the setting processing of an occluding candidate area is performed. In the initialization instructions, parameters utilized for detection of an occluding object are included.

For example, in a case where an area where an occluding object can exist between the imaging apparatus and the foreground object (player) is already known, the occluding candidate area is set based on the area where the occluding object can exist. Alternatively, the occluding candidate area may be set from the area other than the area in which no occluding object is captured based the area in which no occluding object is captured. It is possible to estimate the area where the occluding object can exist, from the arrangement of the imaging apparatuses 101a to 101d. For example, in a case where an area in which a passerby passes and an area in which equipment is arranged exist between the foreground object and the camera, the area within the input image, in which there is a possibility that a passerby or equipment is captured, is the area where the occluding object can exist. The area where the occluding object can exist may be determined by using a method of estimating the mobile range in accordance with the characteristic of the occluding object whose shape has been detected. Further, for the setting of the occluding candidate area, it may also be possible to use a method of performing estimation on the assumption that the area whose shape does not change for a predetermined period of time is the background area.

It may also be possible for the area setting unit 401 to set the occluding candidate area by using information on the shape of the handrail of the spectator stand, the color indicating the spectator stand, and the like. For example, in a case where the image capturing target is a game stadium of rugby or the like, it may also be possible to set the occluding candidate area based on the sideline drawn on the field. In this case, for example, the range a predetermined distance outside the sideline is also the range for which to generate a three-dimensional model, and therefore, the occluding candidate area is set as an area outside the area for which to generate a three-dimensional model.

In order to make it possible to set the occluding candidate area based on information on the color of the image capturing space and the like, it is sufficient to design a configuration so that the operation modes, parameters or the like, which the area setting unit 401 utilizes for the detection of the occluding candidate area, are included in the occluding area detection information or control instructions from the outside.

In a case where part of a pillar or beam whose shape does not change is captured between the imaging apparatus whose position and orientation are fixed and the foreground object (player), it is possible to always handle the pillar or beam as an occluding object. In this case, it may also be possible to include the mask image representing the shape of the pillar or beam in the captured image as the foreground area or coordinate information representing the shape of the pillar or beam, and a flag indicating that the area of the pillar or beam is not included in the occluding candidate area in the occluding area detection information. Further, it may also be possible to use the mask image representing the shape of the pillar or beam to generate an integrated mask by integrating the mask image with the foreground shape mask.

The viewing angle and orientation of the camera are fixed, and therefore, the same occluding candidate area is set at all times in principle by setting the occluding candidate area first. Because of this, it may also be possible to skip S601 in the processing of the next and subsequent frames.

At S602, the area setting unit 401 sets the area (object detection area) in which to detect the occluding object from the captured image based on the occluding candidate area. Then, the area setting unit 401 stores shape information indicating the position and shape of the object detection area.

Figure 7C:
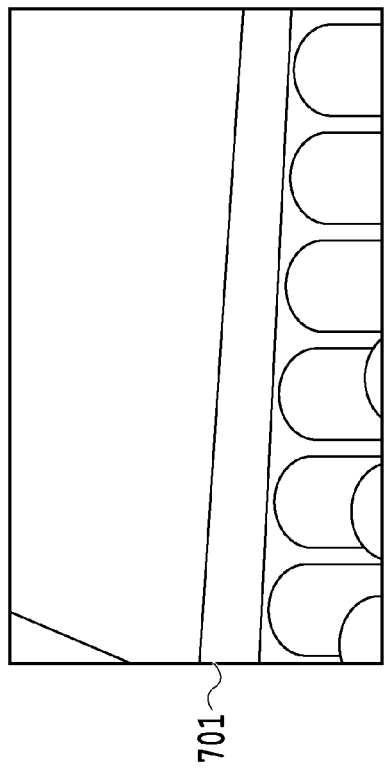
Figure 7D:
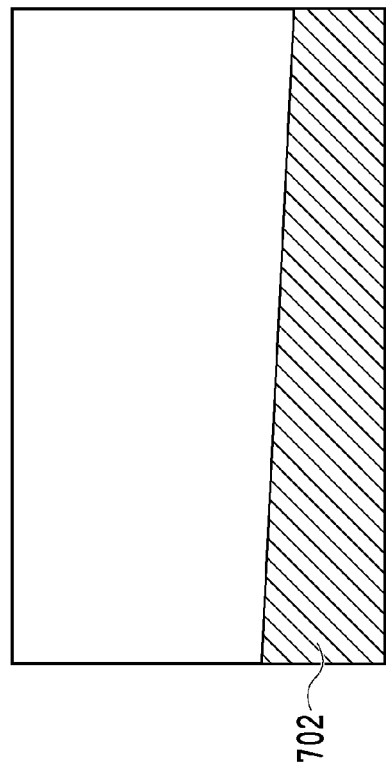

FIG. 7C and FIG. 7D are each a diagram showing an example of the object detection area that is set based on the occluding candidate area 702 in FIG. 7B. The areas indicated by vertical lines in FIG. 7C and FIG. 7D are object detection areas 703 and 704.

In a case where the occluding candidate area 702 in FIG. 7B is set as it is as the object detection area, on a condition that the spectator stands up, the spectator who is an occluding object goes out of the range of the occluding candidate area 702 and there is a possibility that the player is occluded. Because of this, the object detection areas 703 and 704 in FIG. 7C and FIG. 7D are set based on the area obtained by adding an extra area to the occluding candidate area 702 in FIG. 7B.

In a situation in which the shape of the occluding candidate area is complicated or in a situation in which many occluding candidate areas exist dispersedly, there is a case where it is difficult to calculate the area having a possibility of the player being occluded by calculating the extra area in accordance with the shapes of all the occluding candidate areas. Because of this, for example, the image is divided in advance into 12 rectangular areas as indicated by dotted-line rectangles as shown in FIG. 7D. Then, it may also be possible to set the rectangular area including the occluding candidate area or the extra area of the occluding candidate area among the 12 rectangular areas as the object detection area.

In a case where the area where the occluding object can exist is set as the occluding candidate area, the occluding candidate area may be set as the object detection area as it is. In this case, the configuration may be designed so that only the object detected from the area where the occluding object can exist is handled as the occluding object.

At S603, the object detection unit 402 detects an object from the object detection area set at S602.

Figure 8A:
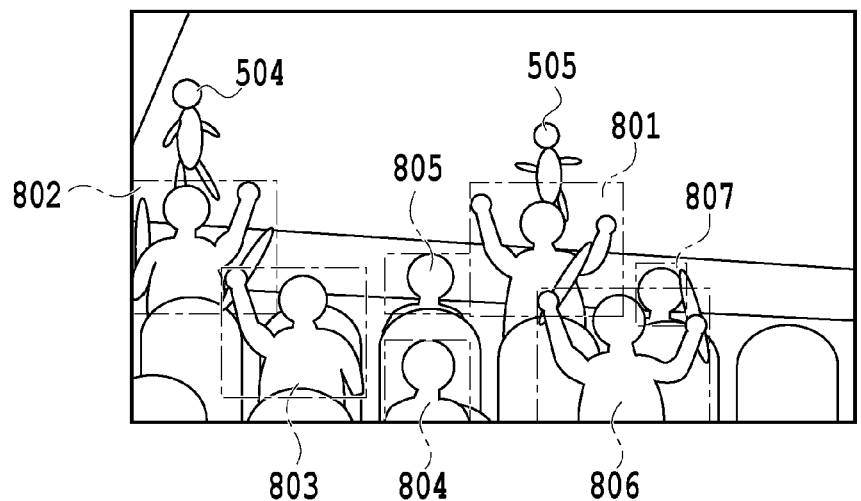
FIG. 8A to FIG. 8C are diagrams for explaining an occluding area.

FIG. 8A is a diagram showing the processing results at this step. FIG. 8A shows the detection results of the objects detected from the object detection area 703 in FIG. 7C in the input image in FIG. 5B. Bounding boxes 801 to 807 respectively show the area in which each of the detected objects (spectators 506 to 512) is included. It may also be possible to represent the detected object by the bounding box as described above.

The object detection unit 402 detects an object by using, for example, color or shape. It may also be possible to detect an object by using the results of performing object detection in the object detection area. As the method of object detection, for example, mention is made of the background subtraction method described previously.

In a case where object detection is performed, it may also be possible to store the bounding box as a history, which is obtained as a result of performing object detection for the object detection area in the past input image. In this case, on a condition that the size or shape of the bounding box changes, it may also be possible to use the area in which there is a change for the detection of an object.

Alternatively, it may also be possible for the object detection unit 402 to detect an object by accumulating histories in advance for a predetermined period of time and using the accumulated histories. As the history, it may be possible to use the input image or the results of performing reduction, object detection, or predetermined image processing, such as statistical processing, for the input image. By observing the accumulated history images or the difference between the results of image processing for the past input image and the input image or the results of image processing for the input image for a predetermined period of time, it is possible to estimate the presence/absence of an object. For example, a histogram indicating the frequency of the pixel value in the object detection area is calculated in advance for each rectangular area in FIG. 7D. Then, in a case where the difference between the mode in the frames up to the immediately previous frame and the mode of the input image becomes a predetermined value or larger, it may also be possible to detect the relevant area as the object area.

At S604, the object detection unit 402 determines whether the filtering parameters are available.

In a case where the filtering parameters are available (YES at S604), the processing advances to S605. At S605, the object detection unit 402 determines an invalid object among the objects detected from the object detection area at S603. Then, the object detection unit 402 deletes the invalid object. Then, the processing advances to S606.

As the filtering parameters, for example, there are parameters relating to the threshold value of the size of the object that is detected from the occluding object detection target area and parameters relating to the color and shape of the object that is determined to be valid. In a case where the filtering parameters are included in the object detection information, it is recommended to store in advance the position of the occluding candidate area, the shape information, and the object detection method in accordance with the object in the occluding area detection information in association with one another.

At S606, the object detection unit 402 determines the object that is not determined to be invalid among the objects detected from the object detection area to be the occluding object. The data format of the occluding object may also be data format indicating the mask image indicating the shape of the detected occluding object, the position of the bounding box including the detected occluding object, and size information.

In a case where the filtering parameters are not available (NO at S604), S605 is skipped and the processing advances to S606. That is, the object detection unit 402 determines all the objects detected from the object detection area at S603 to be the occluding object.

At S607, the occluding area determination unit 403 determines the area in which the occluding object is included in the object detection area to be the occluding area and generates occluding area information indicating the position and size of the occluding area.

Figure 8B:
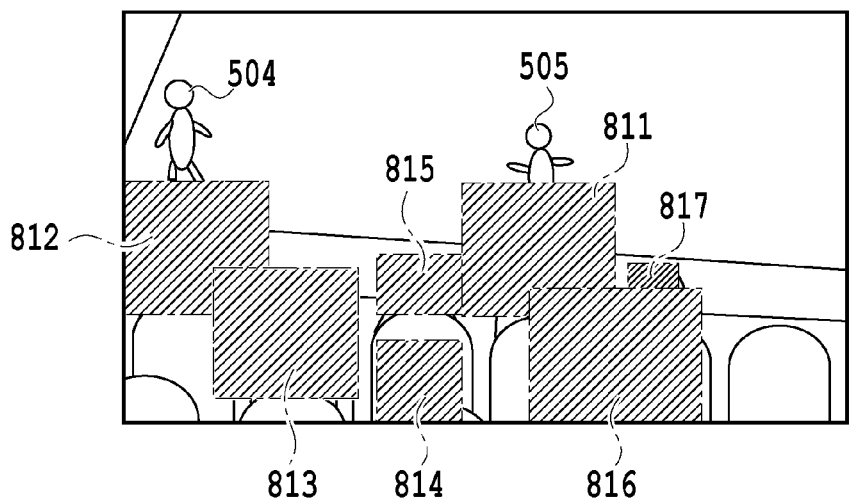

It is assumed that all the detected objects indicated by the bounding boxes 801 to 807 in FIG. 8A are determined to be the occluding object. In this case, it may also be possible to determine the areas of the bounding boxes as they are to be occluding areas 811 to 817 as shown in FIG. 8B. In a case where the occluding areas are shown as the bounding boxes as in FIG. 8B, it is possible to reduce the amount of data of the occluding area information indicating the occluding area. Because of this, in a case where it is desired to reduce the communication load required for the output of the occluding area information because of the constraint on mounting the communication I/F, it is sufficient to determine the occluding area as shown in FIG. 8B.

Figure 8C:
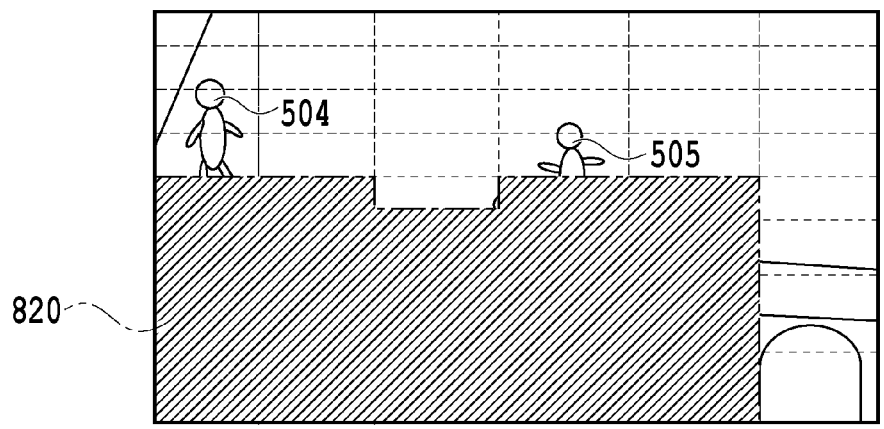

Alternatively, as shown in FIG. 8C, it may also be possible to divide in advance the input image into predetermined rectangular areas and determine a set of rectangular areas including areas in which the occluding object is detected as an occluding area 820. In addition, it may also be possible to determine the shape of the occluding area based on the shape of the occluding object for which expansion processing has been performed.

It may also be possible to generate occluding area information as a mask image similar to the foreground shape mask. In such a case, it is sufficient to generate a mask image representing the occluding area within the captured image by representing the occluding area as the foreground area and dividing the area other than the occluding area as the non-foreground area.

At S608, the occluding area determination unit 403 stores the occluding area information.

On the other hand, in a case where the captured image 513 in FIG. 5B is taken as the input image, the foreground extraction unit 302 generates a foreground shape mask by extracting the foreground based on the difference from the background image (captured image 503) in which no object is included in FIG. 5A.

Figure 9A:
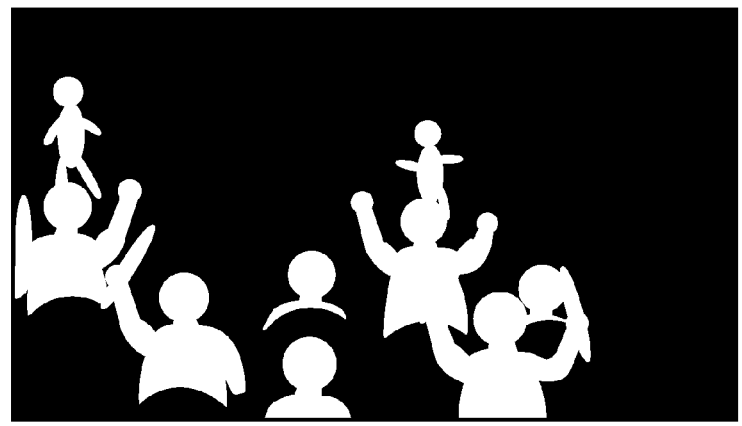
FIG. 9A to FIG. 9C are diagrams showing examples of a foreground shape mask and an integrated mask.

FIG. 9A is a foreground shape mask generated by extracting the foreground from the captured image in FIG. 5B. In FIG. 9A, the white area indicates the foreground area and the black area indicates the non-foreground area, which is the area other than the foreground.

The three-dimensional model generation unit 305 generates an integrated mask by integrating the occluding area indicated by the occluding area information stored at S608 in the flowchart in FIG. 6 and the foreground shape mask generated by the foreground extraction unit 302.

Figure 9B:
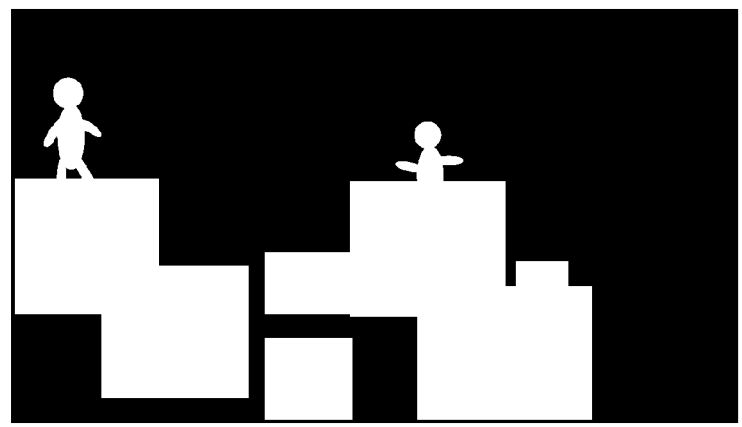
Figure 9C:
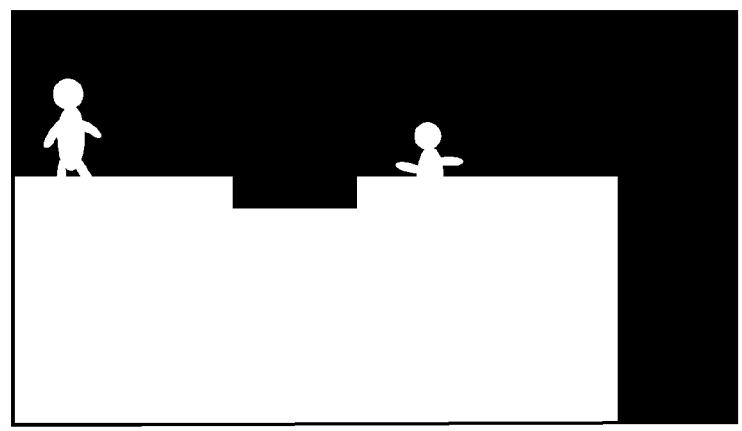

FIG. 9B and FIG. 9C are each a diagram showing an example of the integrated mask. In the integrated masks in FIG. 9B and FIG. 9C, the foreground area is indicated by the white area and the other non-foreground area is indicated in black.

In a case where the foreground shape mask in FIG. 9A is generated from the captured image in FIG. 5B and the occluding areas 811 to 817 shown in FIG. 8B are determined from the captured image in FIG. 5B, the integrated mask shown in FIG. 9B is generated by the three-dimensional model generation unit 305.

Further, in a case where the occluding area 820 shown in FIG. 8C is determined from the captured image in FIG. 5B, the integrated mask shown in FIG. 9C is generated by the three-dimensional model generation unit 305. In a case where some areas among the areas divided in advance as in FIG. 8C are determined to be the occluding area, it is possible to reduce the load of the integrated mask generation processing using the occluding area.

Then, the three-dimensional model generation unit 305 generates a three-dimensional model of the foreground object by the visual hull method using the integrated mask in place of the foreground shape mask corresponding to the plurality of imaging apparatuses.

Figure 10A:
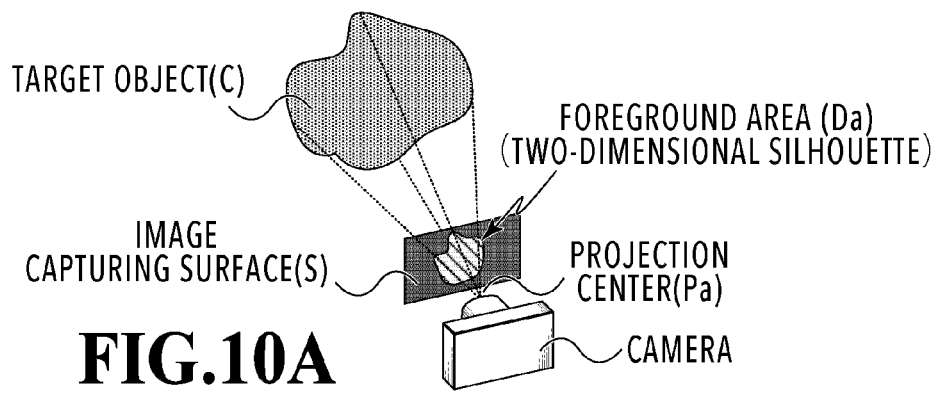
FIG. 10A to FIG. 10C are diagrams for explaining a generation method of a three-dimensional model by a visual hull method.
Figure 10B:
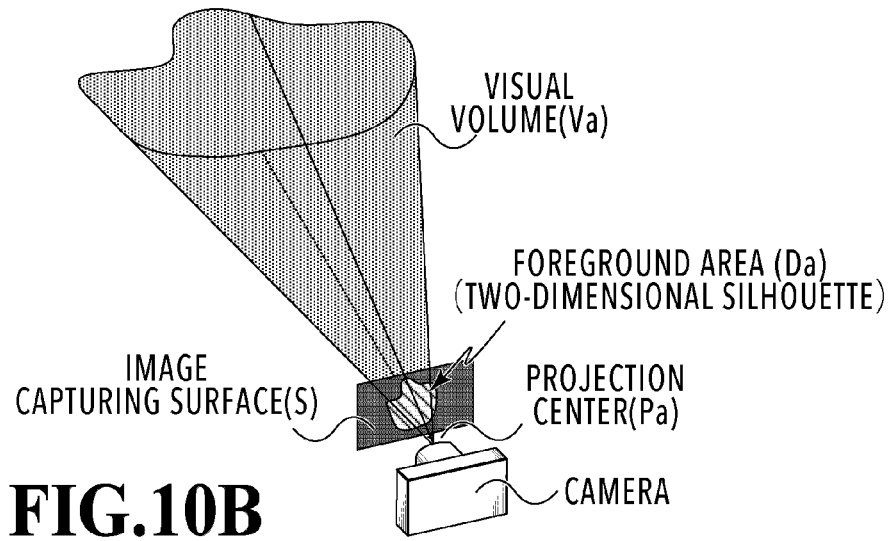
Figure 10C:
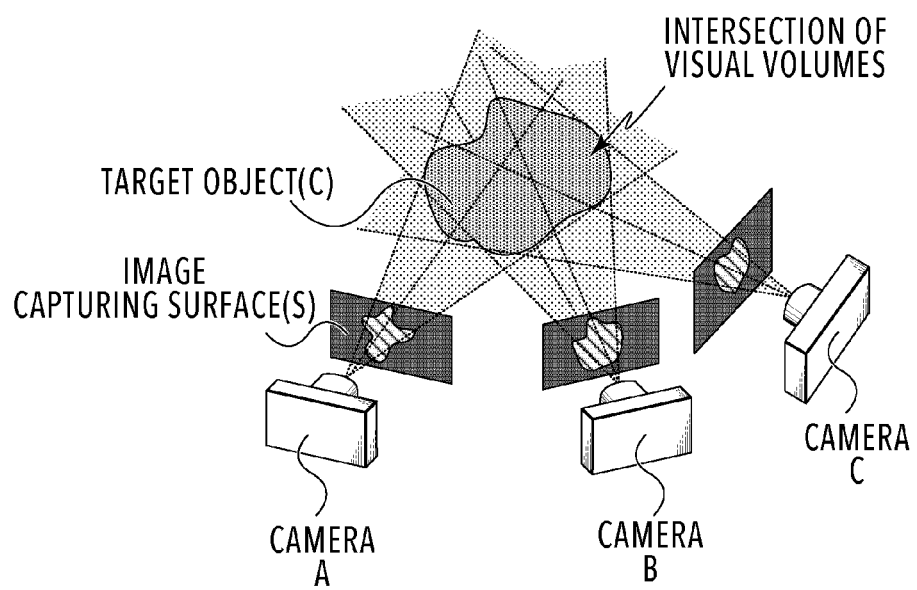

FIG. 10A, FIG. 10B, and FIG. 10C are diagrams showing basic principles of the visual hull method. FIG. 10A is a diagram in a case where the imaging apparatus captures a target object C, which is the foreground object. By performing binarization based on the difference in color or luminance between the captured image obtained by capturing the target object C and the background image, a mask image in which a two-dimensional silhouette (foreground area) of the target object C is included is obtained.

FIG. 10B is a diagram showing a cone that spreads into a three-dimensional space from a projection center (Pa) of the imaging apparatus so that each side of the cone passes each point on the contour of a two-dimensional silhouette Da. This cone is called a visual volume Va by the imaging apparatus. FIG. 10C is a diagram showing the way the three-dimensional model of the foreground object is found by a plurality of visual volumes. As shown in FIG. 10C, from the two-dimensional silhouette Da based on the images captured in synchronization by a plurality of different imaging apparatuses whose positions are different from one another, a plurality of visual volumes of each imaging apparatus is found. In the generation of the three-dimensional model by the visual hull method, by finding the intersection (common area) of the visual volumes corresponding to a plurality of imaging apparatuses, the three-dimensional model of the target object is generated.

The three-dimensional model is represented by a set of voxels. Specifically, the generation-target space is filled with voxels, which are minute rectangular parallelepipeds. Then, in a case where each voxel in the generation-target space is back-projected onto the plane of each imaging apparatus 101, the voxels that are back-projected onto the inside of the foreground area in the mask image of all the imaging apparatuses 101 are left as the foreground and the other voxels are deleted. As described above, by deleting the voxels that are not included within the foreground area of the mask image, the three-dimensional model of the foreground object is generated by the voxels.

In the present embodiment, by using the integrated mask obtained by merging the occluding area that is taken as the foreground area with the foreground shape mask, it is possible to take the area in which the foreground object is occluded as the foreground area. Because of this, it is possible to leave many foreground areas. Consequently, even in a case where the player for whom to generate a three-dimensional model is occluded, it is possible to suppress voxels to be used to configure the player from being deleted unnecessarily.

It may also be possible to use the occluding area information for extracting the foreground from the input image whose time code matches with that of the occluding area information. For example, the foreground shape mask in FIG. 9A is the foreground shape mask generated by extracting the foreground from the entire surface of the input image, but in addition to this, it may also be possible for the foreground extraction unit 302 to generate the foreground shape mask by extracting the foreground from the area other than the occluding area of the input image. In that case, by taking the occluding area as the foreground area, the same image as that of the integrated mask is generated, and therefore, it is possible to reduce the processing load of the generation of the integrated mask. Further, the target area from which to extract the foreground by the extraction unit 302 becomes smaller, and therefore, the processing load of the foreground extraction unit 302 to extract the foreground is reduced. Furthermore, it is possible to preferentially extract the foreground object for which to generate a three-dimensional model.

It may also be possible for the background generation unit 303 to use the occluding area information for generating the background image whose time code matches with that of the occluding area information. For example, it may also be possible to use the image corresponding to the area of the captured image, which is designated as the occluding area information, for updating the background texture.

In a case where a spectator, staff or the like existing at a position close to the foreground object (player) is captured by a plurality of imaging apparatuses and occludes the foreground object (player), it may happen quite frequently that it is not possible to obtain in advance the position and shape of the spectator, staff or the like. In such a case, in order to generate a highly accurate three-dimensional model, it is necessary to increase the number of imaging apparatuses or install the imaging apparatus at a position at which the player is not occluded by the obstacle. According to the present embodiment, even in a case where there is an obstacle that is not stationary between the foreground object (player) for whom to generate a three-dimensional model and the imaging apparatus, it is possible to suppress a defect caused by the obstacle from occurring in the three-dimensional model of the foreground object (player).

It is also considered to generate a three-dimensional model by generating a mask image by taking all the areas where the occluding object can exist on the captured image to be the occluding area (foreground area). However, in this case, the foreground area and non-foreground valid for the generation of a three-dimensional model of the foreground becomes smaller. On the other hand, in the present embodiment, part of the object detection area, which is the area where the occluding object can exist, is taken to the occluding area. Therefore, it is possible to suppress the foreground area and the non-foreground area valid for the generation of a three-dimensional model from becoming smaller.

According to the technique of the present disclosure, it is possible to generate three-dimensional shape data of an object with a high accuracy.

Other Embodiments

In the above-described embodiment, explanation is given on the assumption that the virtual viewpoint image generation apparatus 200 generates a three-dimensional model and a virtual viewpoint image, but it may also be possible to implement the functions included in the virtual viewpoint image generation apparatus 200 by one or more apparatuses different from the virtual viewpoint image generation apparatus 200. For example, an aspect may be accepted in which the extraction of a foreground, the image processing to generate occluding area information, the generation of a three-dimensional model, and the generation of a virtual viewpoint image are performed by different apparatuses.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-199189 filed Dec. 8, 2021, which are hereby incorporated by reference wherein in their entirety.

What is claimed is:

1. An image processing apparatus comprising:
one or more memories storing instructions; and
one or more processors executing the instructions to:
 obtain a plurality of captured images obtained by a plurality of imaging apparatuses capturing an image capturing area in which a target object for three-dimensional shape data generation exists;
 set a first area in a first captured image captured by a first imaging apparatus of the plurality of imaging apparatuses, the first area including an area of a spectator stand, the spectator stand existing between the target object and the first imaging apparatus;
 determine an area of the target object detected from each of the plurality of captured images as a first foreground area;
 in a case where an object is detected from the first area in the first captured image, further determine an area larger than the detected object from the first area as a second foreground area, irrespective of whether the target object is included in the first area in the first captured image or not;
 generate an integrated mask by merging the first foreground region determined from the first captured image with the second foreground region determined from the first captured image; and
 generate three-dimensional shape data of the target object based on the integrated mask and the first foreground areas determined from captured image other than the first captured image among the plurality of captured images,
 wherein the three-dimensional shape data is represented by a set of voxels.

2. The image processing apparatus according to claim 1, wherein
the first area is set based on an area where a spectator who is not the target object can exist.

3. The image processing apparatus according to claim 1, wherein
the object is detected from the first area by performing object detection in the first area.

4. The image processing apparatus according to claim 1, wherein
based on history information on images captured by the first imaging apparatus, the object is detected from the first area.

5. The image processing apparatus according to claim 1, wherein
in a case where the second foreground area is determined from the first area, a rectangular area including the area of the object detected from the first area is determined as the second foreground area.

6. The image processing apparatus according to claim 1, wherein
the first captured image is divided into areas each having a predetermined size, and
in a case where the second foreground area is determined from the first area, an area of the divided areas which includes the object detected from the first area is determined as the second foreground area.

7. The image processing apparatus according to claim 1, wherein
in a case where the second foreground area is determined from the first area, an area obtained as a result of performing, as image processing, processing of expanding an area of the object detected from the first area is determined as the second foreground area.

8. An image processing method comprising:
obtaining a plurality of captured images obtained by a plurality of imaging apparatuses capturing an image capturing area in which a target object for three-dimensional shape data generation exists;
setting a first area in a first captured image captured by a first imaging apparatus of the plurality of imaging apparatuses, the first area including an area of a spectator stand, the spectator stand existing between the target object and the first imaging apparatus;
determining an area of the target object detected from each of the plurality of captured images as a first foreground area;
in a case where an object is detected from the first area in the first captured image, further determining an area larger than the detected object from the first area as a second foreground area, irrespective of whether the target object is included in the first area in the first captured image or not;
generating an integrated mask by merging the first foreground region determined from the first captured image with the second foreground region determined from the first captured image; and
generating three-dimensional shape data of the target object based on the integrated mask and the first foreground areas determined from captured image other than the first captured image among the plurality of captured images,
wherein the three-dimensional shape data is represented by a set of voxels.

9. A non-transitory computer readable storage medium storing a program which causes a computer to perform an image processing method, the image processing method comprising:
specifying a first area in a first captured image captured by a first imaging apparatus of the plurality of imaging apparatuses, the first area including an area of a spectator stand, the spectator stand existing between the target object and the first imaging apparatus;

determining an area of the target object detected from each of the plurality of captured images as a first foreground area;

in a case where an object is detected from the first area in the first captured image, further determining an area larger than the detected object from the first area as a second foreground area, irrespective of whether the target object is included in the first area in the first captured image or not;

generating an integrated mask by merging the first foreground region determined from the first captured image with the second foreground region determined from the first captured image; and generating three-dimensional shape data of the target object based on the integrated mask and the first foreground areas determined from captured image other than the first captured image among the plurality of captured images, wherein the three-dimensional shape data is represented by a set of voxels.

* * * * *